(No Model.)
F. McC. JANSEN.
HARROW.
No. 328,782. Patented Oct. 20, 1885.
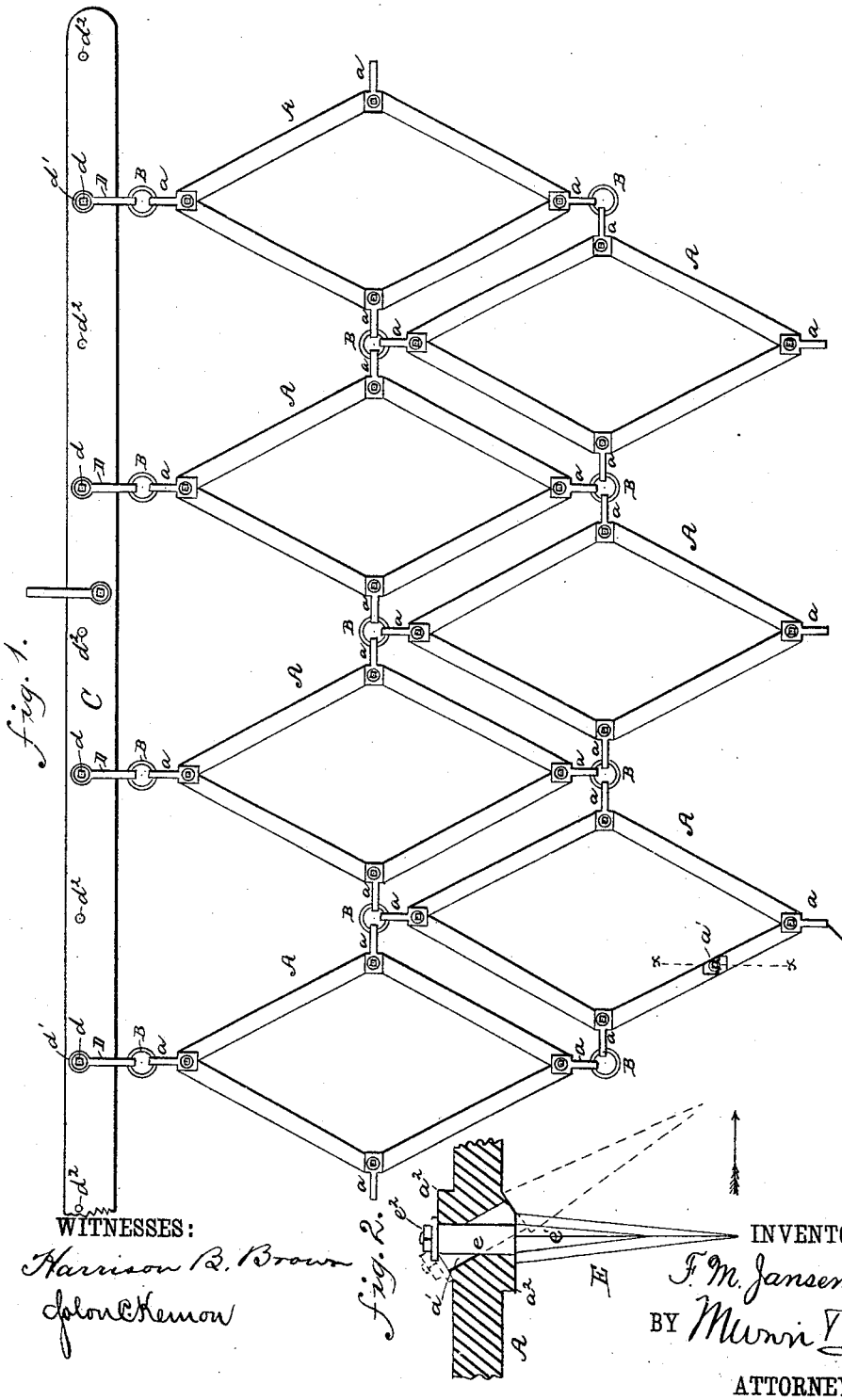
WITNESSES:
Harrison B. Brown
John C. Kenrow
INVENTOR:
F. M. Jansen
BY Munn & Co.
ATTORNEYS.

UNITED STATES PATENT OFFICE.

FRANKLIN McCOY JANSEN, OF SHELDON, IOWA.

HARROW.

SPECIFICATION forming part of Letters Patent No. 328,782, dated October 20, 1885.

Application filed November 26, 1884. Serial No. 148,910. (No model.)

*To all whom it may concern:*

Be it known that I, FRANKLIN MCCOY JANSEN, a citizen of the United States, residing at Sheldon, in the county of O'Brien and State of Iowa, have invented certain new and useful Improvements in Harrows, of which the following is a description.

Figure 1 is a plan view of my improved harrow looking downward from above. Fig. 2 is a section through one of the tooth-sockets taken on the line $x\,x$ in Fig. 1.

My invention relates to harrows for farm use; and it consists in the detailed construction and combination of the parts hereinafter fully described, whereby the harrow is better adapted to its work both on rough and on smooth grounds, and can be altered so as to present more or less harrowing surface as occasion requires.

Similar letters of reference indicate corresponding parts in all the figures.

My harrow consists of a series of diamond-shaped frames, A, provided with a shackle, $a$, at each of their angles, and united to one another by the rings B. Each ring B, coming at the extreme ends of the harrow, is adapted to engage with the double-tree C by means of a clevis, D, provided with a pin, $d$, which passes through a hole in the said double-tree.

The double-tree C is provided with two series of holes, $d'$ and $d^2$, so that either an odd or an even number of frames can be attached to it, and the harrow thus made narrower or wider, as occasion requires. When the harrow is supplied with an even number of frames, the center line of the draft attachment will lie about midway between the two middle ones. Two other frames can be added, one on either side, according to the length of the double-tree, and each addition so made will increase the width of the harrow by an amount equal to the width of the two frames. When desired to increase the width of the harrow by an amount equal to the width of the frame only, the clevises are changed from their position, as shown in the drawings, and coupled to holes $d^2$ in the double-tree. This will bring a central frame nearly in line with the draft attachment, and a single frame can then be attached to one side of the harrow to make it draw evenly. In this latter case the harrow will have an odd number of frames in the front row next to the double-tree.

Each frame A is provided with sockets $a'$ for the reception of the harrow-teeth E. These sockets $a'$ are made with projecting bosses $a^2$ on their front and rear sides, and with the sides of the rectangular hole in them corresponding with these bosses made partly straight and partly sloping, so that the teeth E can be used straight when the harrow is drawn in the direction of the arrow in Fig. 2.

The teeth can be arranged and used slanting by fixing them in the position shown by the dotted lines in Fig. 2. The double-tree should then be attached to the other end of the harrow, so that the frames may be drawn in the opposite direction to the arrow in Fig. 2.

Each tooth E consists of a rectangular shoulder, $e$, engaging with a socket, $a'$, of the frames, a diamond section, tapering blade $e'$, and a nut, $e^2$, for securing the tooth firmly in position.

Having thus described my invention, what I claim as new, and desire to secure by Letters Patent, is—

In a harrow, the combination of a series of frames, A, provided with tooth-sockets $a'$, having two of their opposite sides partly straight and partly sloping, and bosses $a^2$, with teeth E, having shoulders $e$, blades $e'$, and nuts $e^2$, substantially as described and shown, and for the purpose set forth.

FRANKLIN McCOY JANSEN.

Witnesses:
 J. F. FENERSTEIN,
 ED C. BROWN.